United States Patent
Lu et al.

(10) Patent No.: US 11,030,271 B2
(45) Date of Patent: Jun. 8, 2021

(54) CONTENT CACHING FOR FAST LOAD TIME

(71) Applicant: Microsoft Technology Licensing, LLC, Redmond, WA (US)

(72) Inventors: Yumao Lu, Redmond, WA (US); Yi Zhang, Bothell, WA (US); Fei Wang, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/331,883

(22) PCT Filed: Oct. 31, 2016

(86) PCT No.: PCT/CN2016/104161
§ 371 (c)(1),
(2) Date: Mar. 8, 2019

(87) PCT Pub. No.: WO2018/076388
PCT Pub. Date: May 3, 2018

(65) Prior Publication Data
US 2019/0213230 A1     Jul. 11, 2019

(51) Int. Cl.
*G06F 17/00*     (2019.01)
*G06F 16/957*    (2019.01)
(Continued)

(52) U.S. Cl.
CPC ........ *G06F 16/9574* (2019.01); *G06F 12/123* (2013.01); *G06F 16/00* (2019.01); *G06F 16/9538* (2019.01); *G06F 16/9577* (2019.01)

(58) Field of Classification Search
None
See application file for complete search history.

(56) References Cited

U.S. PATENT DOCUMENTS

| 6,021,426 A | 2/2000 | Douglis et al. |
| 6,931,439 B1 * | 8/2005 | Hanmann ........... G06F 16/9574 709/219 |

(Continued)

FOREIGN PATENT DOCUMENTS

| CN | 103744853 A | 4/2014 |
| CN | 104598603 A | 5/2015 |

OTHER PUBLICATIONS

Berry, et al., "Toward Automatic State Management for Dynamic Web Services", In Proceedings of Network Storage Symposium, Oct. 1999, 12 Pages.

(Continued)

*Primary Examiner* — Mustafa A Amin
(74) *Attorney, Agent, or Firm* — Schwegman Lundberg & Woessner, P.A.

(57) ABSTRACT

Techniques for improving content load time are described. A method comprises: receiving, from a search service, a plurality of search results in response to a search query, wherein each of the plurality of search results includes a result link pointing to an object stored on a content source; receiving, from the search service, auxiliary information indicating that, for at least one of the plurality of search results, a copy of at least a portion of the object that the result link of the at least one search result points to is cached within a cache service associated with the search service; and retrieving, from the cache service, the cached copy of at least the portion of the object in response to a selection of the result link of the at least one search result.

7 Claims, 6 Drawing Sheets

(51) Int. Cl.
   *G06F 16/00*      (2019.01)
   *G06F 16/9538*    (2019.01)
   *G06F 12/123*     (2016.01)

(56) References Cited

U.S. PATENT DOCUMENTS

| | | | |
|---|---|---|---|
| 7,587,398 | B1 | 9/2009 | Fredricksen et al. |
| 8,688,702 | B1 | 4/2014 | Chapman |
| 8,924,411 | B2 | 12/2014 | Rajkumar et al. |
| 8,977,653 | B1 | 3/2015 | Mahkovec et al. |
| 9,141,669 | B2 | 9/2015 | Jellick et al. |
| 2004/0128346 | A1 | 7/2004 | Melamed et al. |
| 2005/0198589 | A1* | 9/2005 | Heikes ............... G06F 9/451 715/805 |
| 2007/0005564 | A1* | 1/2007 | Zehner ............... G06F 16/283 |
| 2007/0208828 | A1 | 9/2007 | Brier et al. |
| 2009/0077173 | A1 | 3/2009 | Lowery et al. |
| 2009/0288141 | A1 | 11/2009 | Khachaturov |
| 2012/0016752 | A1* | 1/2012 | Crim ............... G06Q 30/0277 705/14.73 |
| 2013/0151652 | A1* | 6/2013 | Brech ............... G06F 15/167 709/216 |
| 2014/0280925 | A1 | 9/2014 | Wee et al. |
| 2015/0039713 | A1* | 2/2015 | Martini ............... H04L 67/2842 709/213 |
| 2015/0058308 | A1 | 2/2015 | Zheng |

OTHER PUBLICATIONS

Challenger, et al., "Efficiently Serving Dynamic Data at Highly Accessed Web Sites", In Journal of IEEE/ACM Transactions on Networking, vol. 12, Issue 2, Apr. 2004, pp. 233-246.

Douglis, et al., "HPP: HTML Macro-Preprocessing to Support Dynamic Document Caching", In Proceedings of the USENIX Symposium on Internet Technologies and Systems, Dec. 1997, 14 Pages.

Koehl, et al., "Surviving a Search Engine Overload", In Proceedings of the 21st International Conference on World Wide Web, Apr. 16, 2012, pp. 171-180.

PCT/CN2016/104161, "International Search Report and Written Opinion Issued in PCT Application No. PCT/CN2016/104161", dated Jul. 27, 2017, 11 Pages.

"Search Report Issued in European Patent Application No. 16919729.0", dated Feb. 17, 2020, 7 Pages.

Wang, Jia, "A Survey of Web Caching Schemes for the Internet", In Journal of ACM SIGCOMM Computer Communication Review, vol. 29, Issue 5, Oct. 5, 1999, pp. 36-46.

* cited by examiner

CONTENT CACHING FOR FAST LOAD TIME

CROSS-REFERENCE TO RELATED APPLICATIONS

This application is a U.S. National Stage Filing under 35 U.S.C. 371 of International Patent Application Serial No. PCT/CN2016/104161, filed Oct. 31, 2016, and published as WO 2018/076388 A1 on May 3, 2018, which application and publication are incorporated herein by reference in their entirety.

BACKGROUND

Internet browsing including Internet searching is becoming increasingly common in our daily life. Through the interaction with a search engine, one can easily obtain a large number of search results of his interest on the Internet. Each search result may typically include a result link to a Web page on a source Web server, among others. One may click on a result link of one search result and thus the Web page on the source Web server is loaded for further browsing. There is still much room for improvements especially regarding the browsing speed, although the rapid development of computer processing and storage capabilities, network architectures, bandwidth and the like has continually led to the entire Internet running faster than ever.

SUMMARY

This summary is provided to introduce a selection of concepts in a simplified form that are further described below in the detailed description. This summary is not intended to identify any key features or essential features of the claimed subject matter, nor is it intended to be used as an aid in determining the scope of the claimed subject matter.

According to an aspect of the present disclosure, a method is provided. The method comprises: receiving, from a search service, a plurality of search results in response to a search query, wherein each of the plurality of search results includes a result link pointing to an object stored on a content source; receiving, from the search service, auxiliary information indicating that, for at least one of the plurality of search results, a copy of at least a portion of the object that the result link of the at least one search result points to is cached within a cache service associated with the search service; and retrieving, from the cache service, the cached copy of at least the portion of the object in response to a selection of the result link of the at least one search result.

According to another aspect of the disclosure, a method is provided. The method comprises: generating, in response to a search query, a plurality of search results, wherein each of the plurality of search results includes a result link pointing to an object stored on a content source; sending the plurality of search results; generating auxiliary information indicating that, for at least one of the plurality of search results, a copy of at least a portion of the object that the result link of the at least one search result points to is cached within a cache service; and sending the auxiliary information.

BRIEF DESCRIPTION OF THE DRAWINGS

Implementations of the present disclosure are illustrated by way of example, and not by way of limitation, in the figures of the accompanying drawings in which like references numerals refers to identical or similar elements and in which.

DETAILED DESCRIPTION

In the following description, numerous specific details are set forth for the purposes of explanation. However, it should be understood that implementations of the invention may be practiced without these specific details. In other instances, well-known circuits, structures and techniques have not been shown in detail in order not to obscure the understanding of the description.

References to "one implementation", "an implementations", "exemplary implementation", "some implementations", "various implementations" or the like throughout the description indicate that the implementation(s) of the invention so described may include particular features, structures or characteristics, but it is not necessarily for every implementation to include the particular features, structures or characteristics. Further, some implementations may have some, all or none of the features described for other implementations.

In the following description and claims, the terms "coupled" and "connected", along with their derivatives may be used. It should be understood that these terms are not intended as synonyms for each other. Rather, in particular implementations, "connected" is used to indicate that two or more elements are in direct physical or electrical contact with each other, while "coupled" is used to indicate that two or more elements co-operate or interact with each other, but they may or may not be in direct physical or electrical contact.

Figure 1:
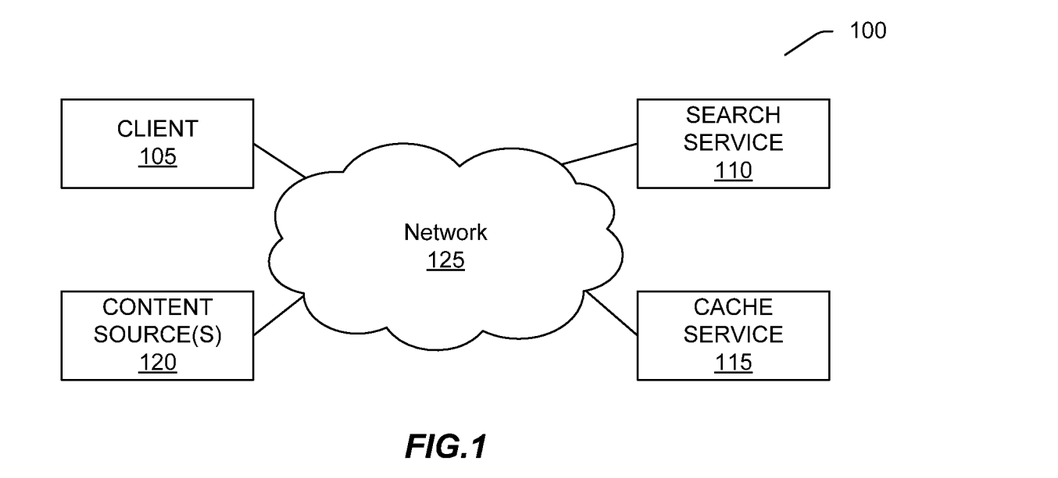
FIG. 1 illustrates an exemplary environment where some implementations of the disclosure may be implemented.

FIG. 1 illustrates an exemplary environment 100 where some implementations of the disclosure may be implemented. The exemplary environment 100 may include a client 105, a search service 110, a cache service 115, and one or more content sources 120, which may be communicatively coupled to each other over a network 125.

In an exemplary scenario of Internet searching and browsing, the search service 110 may be implemented as a search engine/server while the content sources 120 may be implemented as source Web servers that offer various content/objects, such as Web pages. For example, the search engine 110 may implement crawling and indexing of the Web pages on the source Web servers 120. The search engine 110 may also perform the function of providing a list of search results, in response to a user search query. For example, the list of search results may be generated from the indexed content.

In some implementations, the cache service 115 may be coupled to the search service 110, and it may be under the control of the search service 110. In some implementations, the cache service 115 may be owned by the search service 110, and it is possible for them to share processing resources. In some implementations, the cache service 115 is co-located with the search service 110, and it may be implemented as a part of the search service 110. In some alternative implementations, the cache service 115 is located elsewhere on the network 125, for example, at a site closer to the client 105. In some examples, the cache service 115 may be implemented as a cache server for storing copies of portions of the Web pages on the source Web servers, for later use when needed.

In an exemplary scenario, a user of the client 105 may enter, through an input mechanism, a search query (which, for example, may include one or more text keywords) into a search bar associated with the search engine 110 shown on a browser on the client 105, which then generates and returns a plurality of search results for presenting to the client 105 to the user. In some examples, the plurality of search results can be contained in a search results page from the search engine 110. The search results relate to those Web pages offered by the source Web servers 120, which are typically ranked according to certain criteria, such as the relevancy to the text keywords entered. Each search result may include a result link to one Web page on a source Web server 120 and optionally, a description, summary, or snippet of that Web page being linked to, among others. In an exemplary scenario, the user may especially be interested in one of the search results, thus he may click on the result link of that one search result, and the corresponding Web page on the source Web server 120 is loaded onto the browser on the client 105 for browsing.

It could be appreciated that the client 105, the search service 110, the cache service 115 and the content sources 120 may be implemented by a variety of different computing devices, and the present disclosure should not be limited in this context.

Examples of the client 105 may include, without limitation, a mobile device, a personal digital assistant, a wearable device, a mobile computing device, a smart phone, a cellular telephone, a handset, a messaging device, a computer, a personal computer (PC), a desktop computer, a laptop computer, a notebook computer, a handheld computer, a tablet computer, a work station, a mini-computer, a main frame computer, a supercomputer, a network appliance, a web appliance, processor-based systems, multiprocessor systems, consumer electronics, programmable consumer electronics, television, digital television, set top box, or any combination thereof.

Further, while the search service 110 is illustrated as a single server, it would be appreciated that it can also be implemented as a server array or a server farm, or even a cluster of different entities each configured to perform the respective functions, in some implementations. Further, in some implementations, the search service 110 and/or the cache service 115 may be deployed under a distributed computing environment, and may also be implemented using cloud-computing technologies, although the present disclosure is not limited in this context. Further, in some implementations, the content source 170 may refer to a content delivery network (CDN) in case where it is adopted.

Although the network 125 is illustrated as the Internet, the network may be of a wide variety of configurations. For example, the network 125 may include a wide area network (WAN), a local area network (LAN), a wireless network, a public telephone network, an intranet, and so on. In addition, the network 125 may be configured to include multiple networks although a single network 125 is shown here.

Further, although in the above example the user search query is illustrated as one or more text keywords, which for example may be entered by the user through certain input mechanisms such as a keyboard, a keypad, a mouse, a track ball, a trackpoint, a gaming pad, a touch panel, a voice recognition component or the like, it could be appreciated that the user search query may also be one of any other types, for example, a picture (e.g., captured through a still camera), an audio clip (e.g., recorded through a microphone), a video clip (e.g., recorded through a video camera), or the like. The search query may also be any combination of these and other types of user input. The present disclosure should not be limited in this context.

Figure 2:
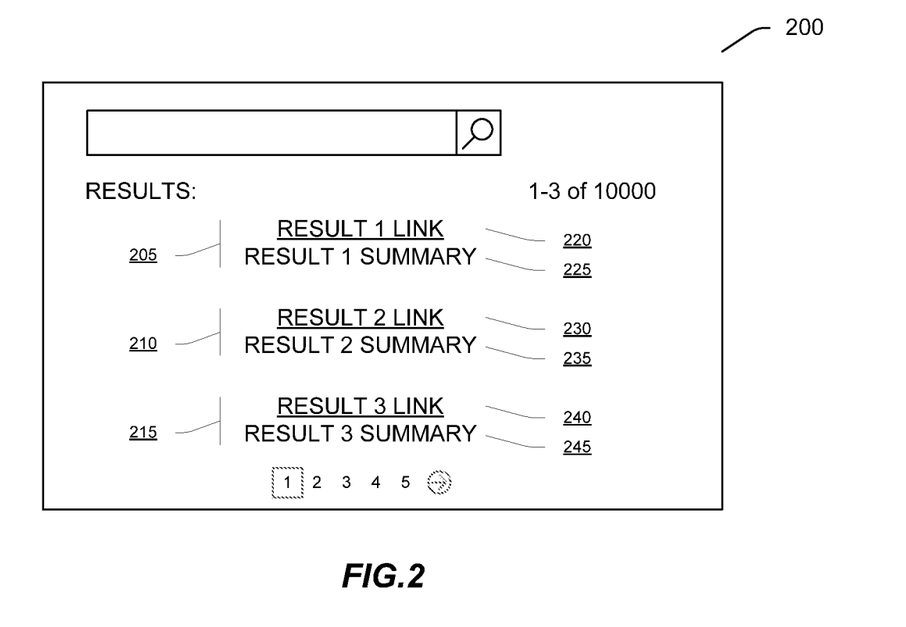
FIG. 2 illustrates an example of a search results page in accordance with some implementations of the disclosure.

FIG. 2 illustrates an example of a search results page 200 in accordance with some implementations of the disclosure. In some implementations, the search results page 200, which may be an exemplary form representing a plurality of search results, may be generated and provided, by the search service 110 of FIG. 1, to a client 105 of FIG. 1 in response to a user search query sent from the client 105 to the search service 110.

As illustrated in the example of FIG. 2, there are 10000 search results in total, and the search results page 200, which is the first one of a plurality of search results pages, includes the top three search results 205, 210, and 215. In the illustrated example, the first search result 205 includes a result 1 link 220 and a result 1 summary 225, the second search result 210 includes a result 2 link 230 and a result 2 summary 235, and the third search result 215 includes a result 3 link 240 and a result 3 summary 245. Each of the result links 220, 230, 240 points to an object (e.g., a Web page) on a content source 130, and the corresponding one of the result summary 225, 235, 245 offers an introduction about that Web page, and/or describes briefly how it matches the user search query, among others.

It has been observed by the inventors that, although the page load time (PLT) of a search results page offered by a search engine owned by any of the major search engine providers has been reduced dramatically in recent time due to their continuous and massive investments on the improvement of search engine performance, the user may still suffer a relatively-long PLT when he clicks on a result link of one search result on the search results page in order to further browse the corresponding original Web page stored on the source Web server, especially when the source Web server has a poor performance due to various factors, e.g., limited processing capability, long distance from the user, and etc.

In some implementations of the disclosure, at least a portion of an object on a content source may be cached within the cache service 115, especially under the control of the search service 110, in some implementations, the object as used herein may include various types of content. Examples of the object may include a Web page, a document (e.g., a Microsoft Word document), a multimedia file (e.g., an audio file, a video file, an image file), and etc. The present disclosure should not be limited in this context.

In some implementations, it is the static content of an object that is desired to be cached within the cache service 115, in some implementations, static content may refer to content that rarely changes, or does not change often. For example, the static content may be a static HTML page, a static logo in a Web page, text of news, novel, thesis, patent, or the like in a Web page, among others.

In contrast, in some implementations, dynamic content may refer to content that is to change often, or generated in real time or dynamically. For example, the dynamic content may be a search results page generated by a search engine, weather forecast in a Web page, certain content generated by a script in a Web page, personalized advertisements in a Web page, and/or any other content that is dynamically generated through the interaction with the source servers.

In some implementations where the object is a Web page, the static content of the object may refer to content contained in the HTML main document of the Web page, and in this case the dynamic content may refer to non-main document content of that Web page. From the perspective of a client, for example, the dynamic content of the Web page may refer to the content that is to be retrieved after the completion of retrieving of the HTML main document of the Web page (i.e., the static content).

Some implementations of the disclosure described herein may especially be suitable for the scenario where static content accounts for a large proportion of each of the objects stored on certain content sources, for example, various news Web pages offered by those news Web sites.

Figure 3:
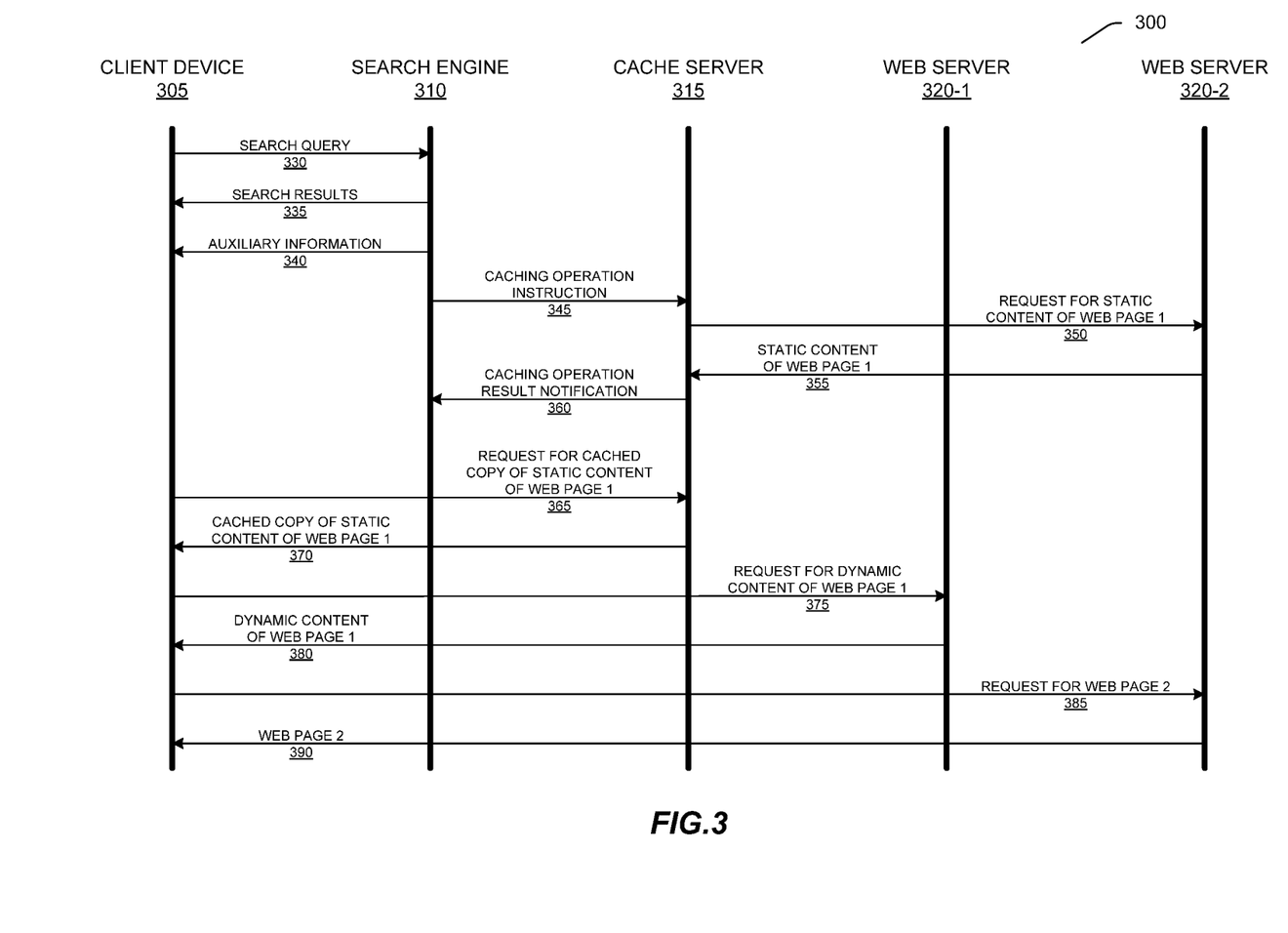
FIG. 3 is a flow chart illustrating an exemplary interaction of various entities in accordance with some implementations of the disclosure.

FIG. 3 is a flow chart illustrating an exemplary interaction of various entities in accordance with some implementations of the disclosure. As illustrated in FIG. 3, the entities include a client device 305, a search engine 310, a cache server 315, and two source Web servers 320-1 and 320-2. The client device 305 may be an example of the client 105 illustrated in FIG. 1, the search engine 310 may be an example of the search service 110 illustrated in FIG. 1, the cache server 315 may be an example of the cache service 115 illustrated in FIG. 1, while the two source Web servers 320-1 and 320-2 may be examples of the content sources 120 illustrated in FIG. 1.

As illustrated in the flow chart of FIG. 3, in some implementations, the client device 305 may send (330) a search query entered by a user, which for example may include one or more keywords. The keyword is received by the search engine 310, and as a response thereto, the search engine 310 generates a plurality of search results each associated with the keywords, and sends (335) back to the client device 305 the generated search results, which will be presented by the client device 305 to the user.

For ease of explanation, in the following description of FIG. 3, we assume that there are only two search results generated by the search engine 310, wherein the first one is associated with a Web page 1 on the Web server 320-1, the second one is associated with a Web page 2 on the Web server 320-2, and wherein, a copy of static content of the Web page 1 has already been cached within the cache server 315.

In some implementations, the search engine 310 may also provide (340) auxiliary information to the client device 305. The auxiliary information is to indicate that the cache server 315 has already stored the cached copy of the static content of the Web page 1. In some implementations, the auxiliary information may include an additional link to the cached copy of the static content of the Web page 1 stored within the cache server 315.

In accordance with some implementations of the disclosure, in order to provide the auxiliary information, the search engine 310 may request and receive, from the cache server 315, information indicating whether or not the cache server 315 has already stored the cached copy of the static content of each of the Web page 1 and the Web page 2; and the search engine 310 may then generate, based on the received information, the auxiliary information and provide the same to the client device 305. In some alternative implementations, the search engine 310 may generate the auxiliary information based on relevant information it has already have, without the need of requesting such information from the cache server 315 at that time. The present disclosure should not be limited in this context.

In accordance with some implementations of the disclosure, since it is the first time for the second search result associated with the Web page 2 on the Web server 320-2 to be included in the plurality of search results (here, two search results, as described before) generated by the search engine 310 the cache server 315 hasn't stored any cached data associated with the Web page 2 yet. In this case, the search engine 310 may instruct (345) the cache server 315 to begin a caching operation to cache within the cache server 315 a copy of the static content of the Web page 2. Accordingly, the cache server 315 requests (350) and then receives (355) the static content of the Web page 2 from the Web server 320-2, and the received static content is to be cached within the cache server 315 as a copy. The search engine 310 will then be informed (360) of this.

Turning now back to the client side, for example, the user who is viewing the two search results being presented by the client device 305 may be interested in the first search result associated with the Web page 1 and thus clicks on the corresponding result link to the Web page 1 on the Web server 320-1. In accordance with some implementations, the client device 305 then determines, based on the received auxiliary information, that the cached copy of the Web page 1 has already been stored within the cache server 315.

In this case, instead of retrieving the entire Web page 1 from the Web server 320-1 via the corresponding result link to the Web page 1 on the Web server 320-1 on which the user has just clicked, the client, device 305 will retrieve (365, 370) the cached copy of the static content of the Web page 1 from within the cache server 315. As for the remaining portion, i.e., the dynamic content of the Web page 1, it is to be retrieved (375, 380) by the client device 305 from the source Web server 320-1. The thus-retrieved cached copy of the static content and the retrieved dynamic content, which collectively constitute the entire Web page 1, will be presented by the client device 305 to the user. That is, at least a portion of the Web page 1 (i.e., the static content thereof) is actually retrieved from the cache server 315 rather than the Web server 320-1, thus a much faster PLT for the Web page 1 can be achieved for the user, although from his perspective he is still visiting the Web server 320-1 for the entire Web page 1. Therefore, the user experience is enhanced in a manner that is unperceivable to the user.

As another example, if the user chooses to click on the result link of the second search result associated with the Web page 2 for which no cached data has been stored within the cache server 315 yet, as indicated by the received auxiliary information, the entire Web page 2 will still be retrieved (385, 390) from the source Web server 320-2, for presenting to the user.

It could be appreciated that the operations described herein can be implemented by software program executed on the respective entities, in some implementations. In some examples, those operations described with respect to the client device 305 could also be implemented in software, such as a browser-like or browser-based application, or even one or more components/modules included in an application. In some examples, one or more of the components/ modules could be embodied as a plug-in, an extension, a proxy, or the like. Similarly, those operations described with respective the search engine 310 could also be implemented in software.

It should be noted that these operations 330-390 are described herein for the purpose of illustration only, and not every one of them is necessary for implementing a specific implementation of the present disclosure. Further, although operations 330-390 are illustrated as separate actions that are executed with different timing by reference to the flow chart FIG. 3, many alternatives are also possible, and the present disclosure should not be limited in the regard.

In some implementations, for example, the operations 335 and 340, i.e., the sending of the search results and the sending of the auxiliary information by the search engine 310, may be combined into one action. In some implementations, for example, the above-described operations 335 and 340, and the operation 345 of instructing the cache server 315 to begin a caching operation, all of which are performed by the search engine 310, may occur simultaneously. In some implementations, as an example, the operation 365 of requesting the cached copy of the static content of the Web page 1 from the cache server 315 and the operation 375 of requesting the dynamic content of the same Web page 1 from the source Web server 320-1, may also be performed by the client device 305 simultaneously.

In accordance with some implementations, the search engine 310 instructs the cache server 315 to initiate a caching operation to cache, within the cache server 315, a copy of the static content of the Web page 2 on the Web server 320-2, when a search result corresponding to this Web page 2 is included, for the first time, in the plurality of search results generated by the search engine 310. This enables the caching mechanism according to some implementations of the present disclosure to operate in an effective and efficient manner.

More particularly, the cache server 315 is not required to store a large amount of cached data which people may have a low interest in and thus may rarely or may even never search for it. What have already been and what is to be cached within the cache server 315 are the content that is anticipated to be accessed quite frequently, from the perspective of the search engine 310, especially considering that the search engine 310 may process a huge number of the same or similar search queries every time, which is particularly true for certain type of Web content, for example but not limited to, news.

In accordance with some implementations, while the first user who sees a plurality of search results including for the first time a particular search result may not enjoy a faster PLT when he clicks on the result link of the particular search result, as the at least part of the object/content (that the result link points to has not yet been cached within the cache server 315 at that time, it will benefit many people who may submit the same or similar search queries subsequently because a caching operation has been triggered to cache at least a portion of the object/content corresponding to the particular search result, in response to the search engine 310 generating the search results for the first user, according to the caching mechanism described above.

Moreover, the first user himself is also likely to benefit from this, as it is often the case that the same user may submit the same or similar search queries to the search engine 310 within a short period in the real environment.

It should be noted that, while the above description illustrates the copy of the static content of the Web page 2 is to be cached within the cache server 315 upon the instruction from the search engine 310 when the search result associated with the Web page 2 is included, for the first time, in the plurality of search results generated by the search engine 310 in response to the search query, other policies for caching the copy of the static content of the Web page 2 are also possible. In some implementations, the cache server 315 may begin to cache the copy of the static content of the Web page 2 on its own initiative, without the need of receiving instruction(s) from the search engine 310. In some other implementations, the search engine 310 may instruct the cache server 315 to cache the copy of the static content of the Web page 2 at different timing from the above illustrated. The present disclosure should not be limited in this context.

Figure 4:
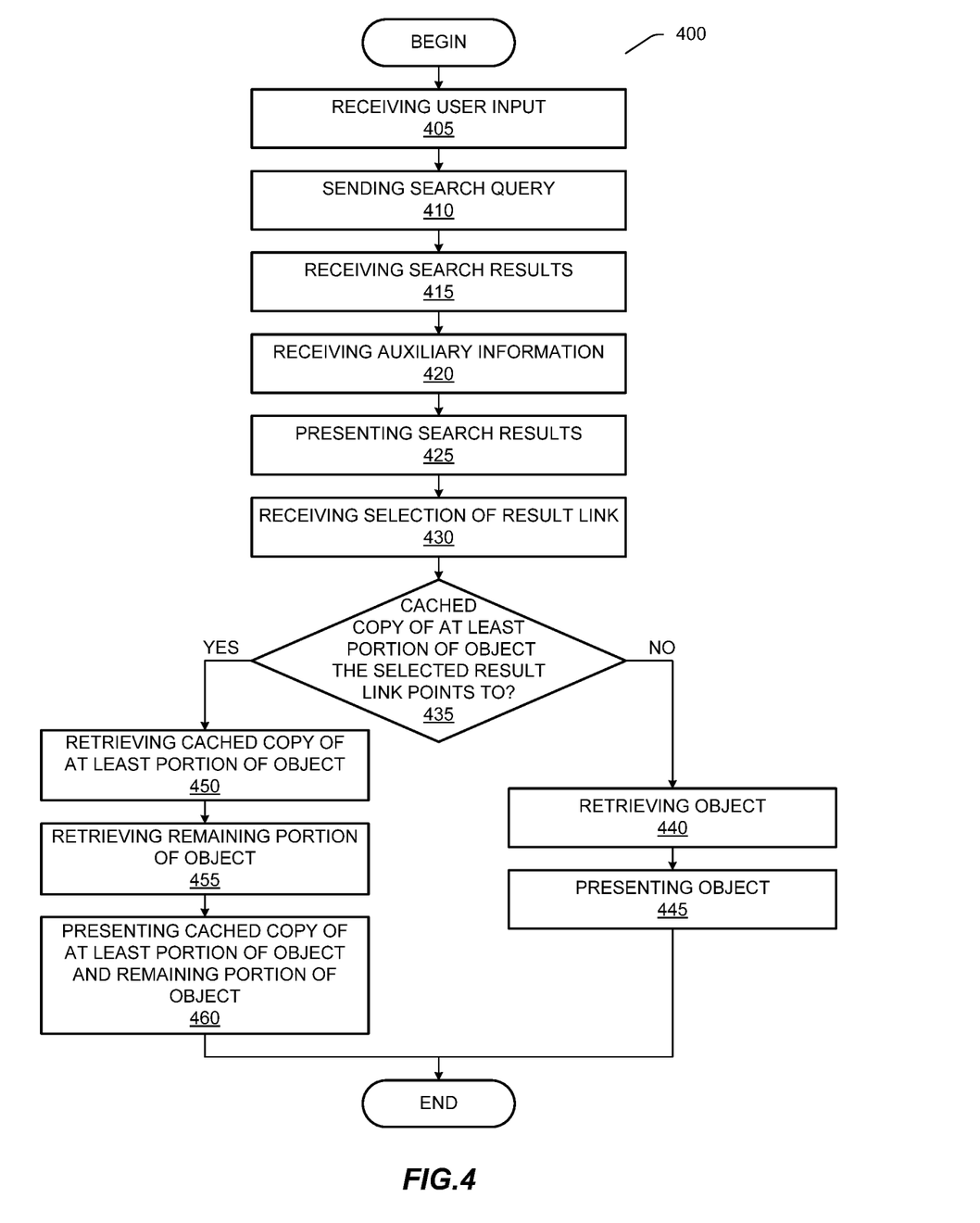
FIG. 4 is a flow chart of an exemplary method in accordance with some implementations of the disclosure.

FIG. 4 illustrates a flow chart of an exemplary method 400 according to some implementations of the present disclosure. For example, the method 400 may be implemented in the client 105 illustrated in FIG. 1, the client device 305 in FIG. 3, or any similar entity(s).

The method 400 begins with Step 405, where a user input is received. The method then proceeds to Step 410, where a search query corresponding to the received user input is sent to a search service (e.g., the search service 110 illustrated in FIG. 1) via a network (e.g., the network 125 illustrated in FIG. 1).

In Step 415, a plurality of search results are received from the search service. The search results are generated by the search service in response to the search query sent thereto. Each of the plurality of search results includes a result link pointing to an object that is stored on a content source (e.g., one of the content sources 120 illustrated in FIG. 1) and that is relevant to the search query.

In Step 420, auxiliary information is received from the search service, in addition to the search results received in Step 415. In some implementations of the disclosure, the received auxiliary information is to indicate, for at least one of the plurality of search results received in Step 415, a copy of at least a portion of the object that the result link of the at least one search result points to has already been cached within a cache service associated with the search service, e.g., the cache service 115 illustrated in FIG. 1.

In Step 425, the search results received in Step 415 are presented to the user, for example, via a display. Then in Step 430, a selection on the result link of one of the plurality of search results being presented is received from the user. In some implementations, the selection by the user may include the user's click on the result link of that one search result.

The method 400 proceeds to Step 435. In this step, it is, judged whether or not a copy of at least a portion of the object that the result link selected by the user in Step 430 points to has already been cached within the cache service, based on the auxiliary information received in Step 420, or in other words, it is judged whether or not the selected result link is the result link of one of the at least one search result indicated by the received auxiliary information. If the answer to the judgement is negative, that is, the cache service has no copy of at least a portion of the object that the selected result link points to, then in Step 440, the entire object that the selected result link points to is retrieved from the corresponding content source.

In Step 445, the retrieved object is presented to the user, for example, via a display. Then the method 400 may finish. In some implementations, the object may include a Web page.

On the other hand, if the answer to the judgement of Step 435 is positive, that is, the cache service do have a cached copy of at least a portion of the object that the result link selected by the user in Step 430 points to, as indicated by the auxiliary information, then the method 400 proceeds to Step 450. In Step 450, the cached copy of at least the portion of the object that the selected result link points to is retrieved from the cache service. In some implementations, it is the static content of the object that has been cached within the cache service and is to be retrieved later when necessary, as described before.

Then in Step 455, the remaining portion of the object that the selected result link points to, if any, is retrieved from the corresponding content source. In some implementations, the remaining portion of the object may refer to the dynamic content of the object.

The method 400 proceeds to Step 460, where the cached copy of at least the portion of the object retrieved from the cache service in Step 450 and the remaining portion of the same object retrieved from the content source in Step 455 (if any), which may collectively constitute the complete object, are presented to the user, for example, via a display. Then the method 400 may finish.

Figure 5:
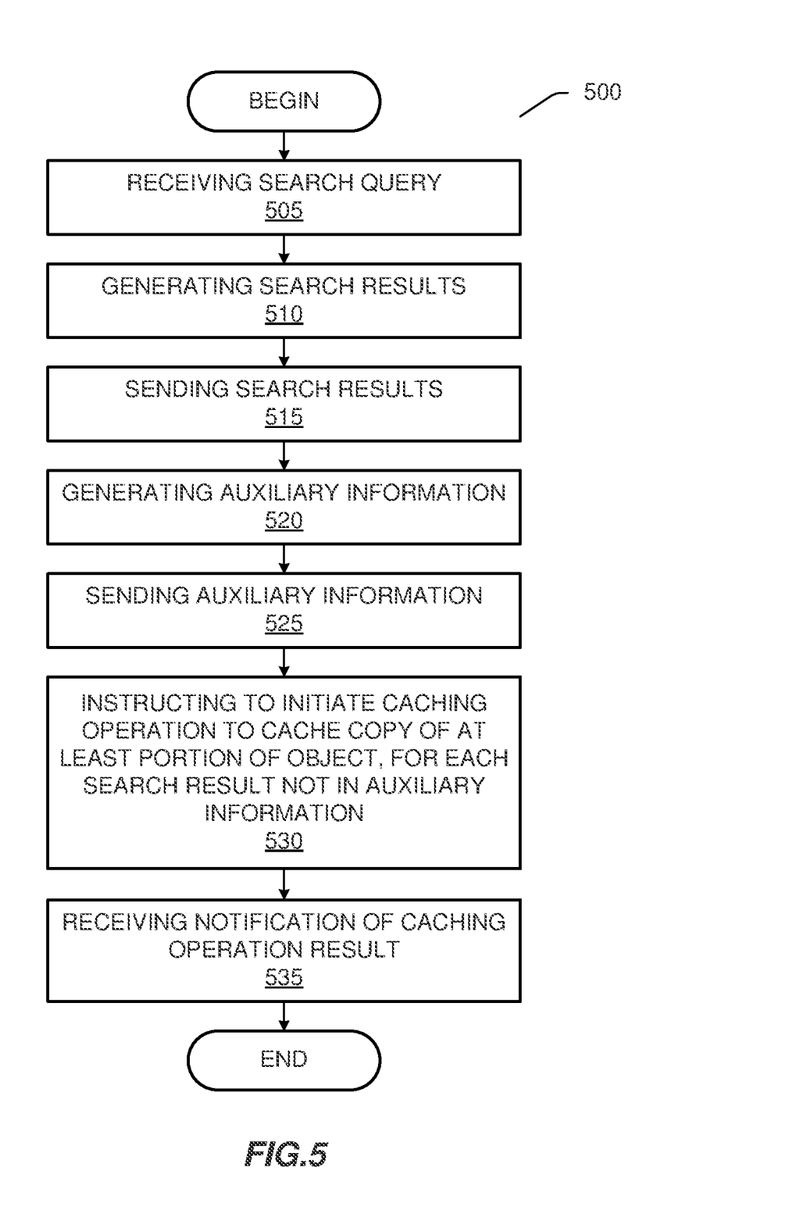
FIG. 5 is a flow chart of an exemplary method in accordance with some implementations of the disclosure.

FIG. 5 illustrates a flow chart of an exemplary method 500 according to some implementations of the present disclosure. For example, the method 500 may be implemented in the search service 110 illustrated in FIG. 1, the search engine 310 in FIG. 3, or any similar entity(s).

The method 500 begins with Step 505, where a search query is received, for example, from a client (e.g., the client 105 illustrated in FIG. 1) via a network (e.g., the network 125 illustrated in FIG. 1).

Then the method 500 proceeds to Step 510. In this step, a plurality of search results are generated as a response to the search query received in Step 505. As described before, each of the plurality of search results includes a result link to an object that is stored on a content source (e.g., one of the content sources 120 illustrated in FIG. 1) and that is relevant to the search query. In some implementations, each of the search results may further include other types of information, for example, a result summary which may offer an introduction about the corresponding object stored on the content source, and/or may briefly describe how this object matches the search query, although the present disclosure is not limited in this context. In some implementations, the object may include a Web page, as described before.

In Step 515, the search results generated in Step 510 are sent back to the client.

In Step 520, auxiliary information is generated, in addition to the search results generated in Step 510. As described before, in some implementations, the generated auxiliary information is to indicate that, for at least one of the plurality of search results generated in Step 510, a copy of at least a portion of the object that the result link of the at least one search result points to has already been cached within a cache service, e.g., the cache service 115 illustrated in FIG. 1 which is associated with the search service 110.

In some implementations, the auxiliary information may also include other types of information. For example, it may include, for the at least one search result, an additional link to a copy, cached within the cache service, of at least a portion of the object that the result link of the at least one search result points to. Further, in an example, at least the portion of the object that has been cached within the cache service may include the static content of the corresponding object, as described before.

In some implementations of the present disclosure, the generating of the auxiliary information may comprise receiving, from the cache service, information indicating that for each of the plurality of search results, whether or not the cache service has already stored. The cached copy of the static content of the object that the result link of the each search result points to. And the generating of the auxiliary information may further comprise generating the auxiliary information based on the received information. The present disclosure should not be limited in this context.

Then in Step 525, the auxiliary information generated in Step 520 is sent to the client.

In some implementations of the present disclosure, the method 500 may further proceed to Step 530, where the cache service is instructed to initiate, for each of the plurality of search results other than the at least one search result indicated in the auxiliary information, a caching, operation to cache, within the cache service, a copy of at least a portion of the object that the result link of the each search result points to. In other words, in case where there is any search result, from among the plurality of search results generated in Step 510, that doesn't have within the cache service a cached copy of at least the portion of the object that the result link of such a search result points to, the cache service is instructed to initiate a caching operation for the search result, to cache the copy of at least the portion of the corresponding object.

Later in Step 535, a notification of the result of the caching operation is received from the cache service. And then, the method 500 may finish. In some implementations, the search service may confirm, from the notification, that the caching operation has been completed successfully. In some implementations, the notification may include a link to the cached copy of at least the portion of the object that the result link points to, within the cache service. In some implementations, the notification may include the timestamp of the cached copy of at least the portion of the object that the result link points to. Other types of information, for example regarding the caching operation and/or the cached copy, may be indicated in the notification as well. Further, while it is illustrated in the above that after instructing the cache service, the search service will receive a notification of the caching operation result from the cache service as a response, it would be appreciated that some other types of notification/confirmation mechanisms are also possible, and the present disclosure should not be limited in this context.

It would be appreciated that although the operations of the exemplary method 400 or 500 are shown in a sequential order, some of the operations may be performed simultaneously, in parallel, or in a different order. For example, the operations in Steps 450 and 455, and/or the operations in Steps 415 and 420 may be performed simultaneously or inversely. For example, the operations in Steps 440 and 445, and/or the operations in Steps 450, 455 and 460, may be performed simultaneously. For example, the operations in Steps 510, 520 and 530, and/or the operations in Steps 515 and 525, may be performed simultaneously. It should be noted that the method 400 or 500 is merely exemplary and not limiting, and not every operation described herein is necessary for implementing a specific implementation of the present disclosure.

In some implementations, the method 400 may include, for example, presenting to the user the cached copy of at least the portion of the object that the selected result link points to, as retrieved in Step 450, in a front view of a user interface. This type of the front view is viewable to the user.

In some implementations, instead of the Step 455 of retrieving only the remaining portion of the object that the selected result link points to from the corresponding content source and the Step 460 of presenting both the cached copy of at least the portion of the object and the remaining portion of the same object, the method 400 may include, for example, retrieving the entire object that the selected result link points to from the corresponding content source and presenting the retrieved object in a back view of the user interface. The back view is underneath the front view and thus is not viewable to the user.

The method 400 may then include, for example, switching the presenting of the retrieved object from the back view to the front view of the user interface, thus the entire object retrieved from the corresponding content source becomes viewable, in lieu of the cached copy of at least the portion of the same object retrieved from the cache service.

With such arrangements, the user may first retrieve a cached copy of at least a portion (for example, static content) of the object from the cache service, enjoying a much faster load time due to the high performance of the cache service which for example is owned by the search service, thus he is able to browse the retrieved static content in a short time. Meanwhile, the entire object is being retrieved from the content source and presented in the back view, as a type of background task. Once the entire object has been retrieved completely, it will be switched to foreground, i.e., to be presented in the front view. Such a switching may be unperceivable to the user, thus enhancing the user experience.

In some implementations, the Step 530 in the exemplary method 500 described above may further comprise, for each of the plurality of search results other than the at least one search result indicated in the auxiliary information, determining if at least one performance measurement of the cache service is better than that of the content source corresponding to the result link of the each search result, and if so, instructing the cache service to initiate the caching operation to cache the copy of at least the portion of the object that the result link points to. In some implementations, the performance measurement may include a response time, and/or available bandwidth, and/or the like. For example, the search service may choose to utilize the cache service only if the cache service can offer better user experience than a corresponding content source.

In some implementations, the exemplary method 500 may further comprise instructing the cache service to replace a cached copy of at least a portion of an object with an updated or newer copy of at least the portion of the same object, based on one or more criteria. In some implementations, such criteria may include a predetermined time interval, and/or a predetermined number of times that the cached copy has been accessed, and/or the like.

In some implementations, the exemplary method 500 may further comprise instructing the cache service to remove a cached copy of at least a portion of an object, based on one or more criteria. In some implementations, such criteria may include a LRU (least recently used) policy, although the present disclosure is not limited in this context.

Other types of mechanisms that could enable the cache service to operate more effectively and efficiently are also possible.

Figure 6:
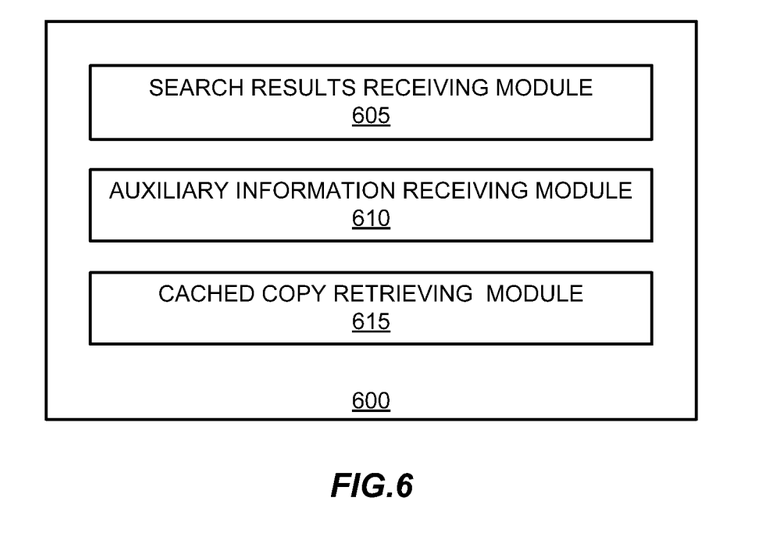
FIG. 6 is a block diagram of an exemplary apparatus in accordance with some implementations of the disclosure.

FIG. 6 is a block diagram of an exemplary apparatus 600 in accordance with some implementations of the disclosure. For example, the apparatus 600 may be implemented in the client 105 illustrated in FIG. 1, the client device 305 in FIG. 3, or any similar entity(s).

The apparatus 600 may comprise a search results receiving module 605 to receive, from a search service, a plurality of search results in response to a search query, wherein each of the plurality of search results includes a result link pointing to an object stored on a content source.

The apparatus 600 may further comprise an auxiliary information receiving module 610 to receive, from the search service, auxiliary information indicating that, for at least one of the plurality of search results, a copy of at least a portion of the object that the result link of the at least one search result points to is cached within a cache service associated with the search service.

The apparatus 600 may further comprise a cached copy retrieving module 615 to retrieve, from the cache service, the cached copy of at least the portion of the object in response to a selection of the result link of the at least one search result.

Figure 7:
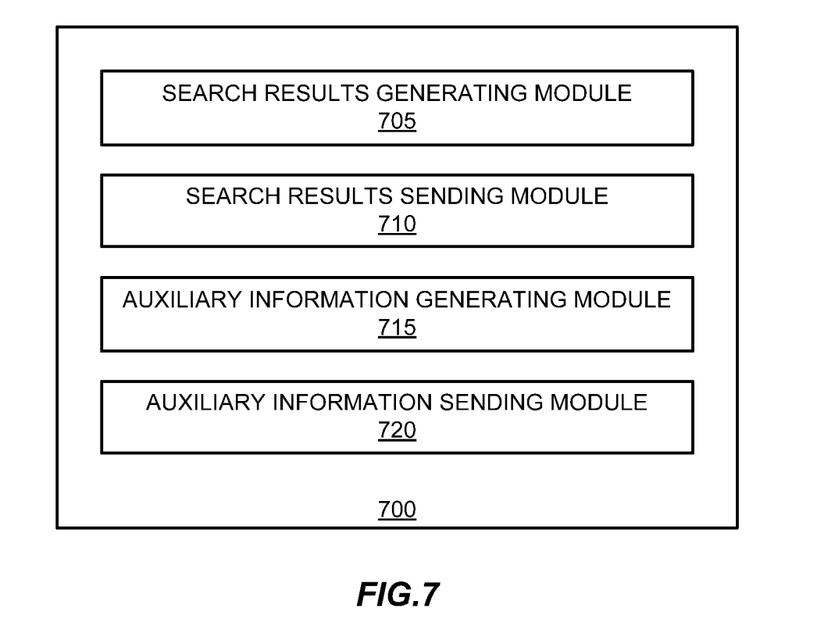
FIG. 7 is a block diagram of an exemplary apparatus in accordance with some implementations of the disclosure.

FIG. 7 is a block diagram of an exemplary apparatus 700 in accordance with some implementations of the disclosure. For example, the apparatus 700 may be implemented in the search service 110 illustrated in FIG. 1, the search engine 310 in FIG. 3, or any similar entity(s).

The apparatus 700 may comprise a search results generating module 705 to generate, in response to a search query, a plurality of search results, wherein each of the plurality of search results includes a result link pointing to an object stored on a content source.

The apparatus 700 may further comprise a search results sending module 710 to send the plurality of search results.

The apparatus 700 may comprise an auxiliary information generating module 715 to generate auxiliary information indicating that, for at least one of the plurality of search results, a copy of at least a portion of the object that the result link of the at least one search result points to is cached within a cache service.

The apparatus 700 may further comprise an auxiliary information sending module 720 to send the auxiliary information.

The apparatus 600 and the apparatus 700 may be implemented by software, hardware, firmware, or any combination thereof. It could be appreciated that although the apparatus 600 is illustrated to contain module 605, 610, and 615 while the apparatus 700 is illustrated to contain module 705, 710, 715, and 720, more or less modules may be included in each of the apparatuses 600 and 700. For example, the apparatus 600 may comprise other modules, or its existing one or more modules may be further configured to perform other actions that have been described with reference to the exemplary method 400, and/or anywhere in the description. Similarly, the apparatus 700 may comprise other modules, or its existing one or more modules may be further configured to perform other actions that have been described with reference to the exemplary method 500, and/or anywhere in the description.

Figure 8:
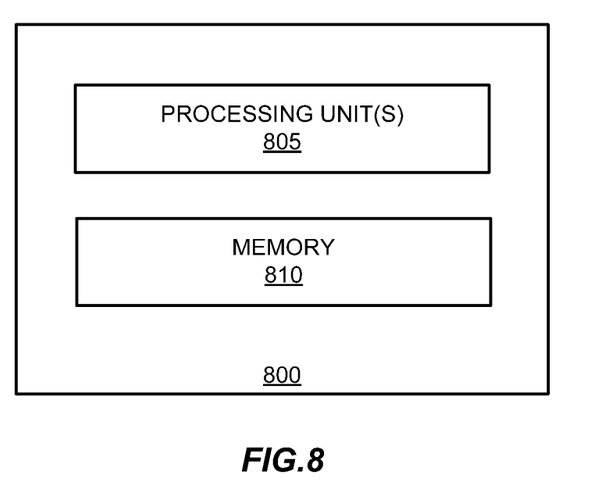
FIG. 8 is a block diagram of an exemplary computing device in accordance with some embodiments of the disclosure.

Turn now to FIG. 8, where a block diagram of an exemplary computing device 800 in accordance with some embodiments of the disclosure is illustrated. As illustrated herein, the computing device 800 may comprise one or more processing units 805 and a memory 810. The one or more processing units 805 may include any type of general-purpose processing units/cores (for example, but not limited to (CPU, GPU), or application-specific processing units, cores, circuits, controllers or the like. The memory 810 may include any type of medium that may be used to store data. The memory 810 is configured to store instructions that, when executed, cause the one or more processing units 805 to perform operations of any method described herein, e.g., the exemplary method 400, the exemplary method 500, or the like.

Various implementations of the present disclosure may be implemented using hardware elements, software elements, or a combination of both. Examples of hardware elements may include devices, components, processors, microprocessors, circuits, circuit elements transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some implementations of the present disclosure may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In some implementations, for example, an article of manufacture may store executable computer program instructions that, when executed by a processing unit, cause the processing unit to perform methods and/or operations described herein. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some implementations of the present disclosure described herein are listed below.

In some implementations, a method is provided. The method comprises: receiving, from a search service, a plurality of search results in response to a search query, wherein each of the plurality of search results includes a result link pointing to an object stored on a content source; receiving, from the search service, auxiliary information indicating that, for at least one of the plurality of search results, a copy of at least a portion of the object that the result link of the at least one search result points to is cached within a cache service associated with the search service; and retrieving, from the cache service, the cached copy of at least the portion of the object in response to a selection of the result link of the at least one search result.

In some implementations, the method further comprises: retrieving, from the content source, the remaining portion of the object.

In some implementations, the method further comprises: presenting the cached copy of at least the portion of the object and the remaining portion of the object.

In some implementations, the method further comprises: presenting, in a front view of a user interface, the cached copy of at least the portion of the object.

In some implementations, the method further comprises: retrieving the object from the content source; and presenting the object in a back view of the user interface.

In some implementations, the method further comprises: switching the presenting of the object to the front view of the user interface.

In some implementations, at least the portion of the object includes static content of the object.

In some implementations, the object includes a Web page.

In some implementations, the auxiliary information includes an additional link associated with the at least one search result, the additional link pointing to the cached copy of at least the portion of the object.

In some implementations, the retrieving further comprises: retrieving, from the cache service, the cached copy of at least the portion of the object via the additional link.

In some implementations, an apparatus is provided. The apparatus comprises: a search results receiving module to receive, from a search service, a plurality of search results in response to a search query, wherein each of the plurality of search results includes a result link pointing to an object stored on a content source; an auxiliary information receiving module to receive, from the search service, auxiliary information indicating that, for at least one of the plurality of search results, a copy of at least a portion of the object that the result link of the at least one search result points to is cached within a cache service associated with the search service; and a cached copy retrieving module to retrieve, from the cache service, the cached copy of at least the portion of the object in response to a selection of the result link of the at least one search result.

In some implementations, a method is provided. The method comprises: generating, in response to a search query, a plurality of search results, wherein each of the plurality of search results includes a result link pointing to an object stored on a content source; sending the plurality of search results; generating auxiliary information indicating that, for at least one of the plurality of search results, a copy of at least a portion of the object that the result link of the at least one search result points to is cached within a cache service; and sending the auxiliary information.

In some implementations, the generating of the auxiliary information further comprises: receiving, from the cache service, information indicating whether or not a copy of at least a portion of the object that the result link of each of the plurality of search results points to is cached within the cache service; and generating the auxiliary information based on the received information.

In some implementations, the method further comprises: instructing the cache service to initiate, for each of the plurality of search results other than the at least one search result, a caching operation to cache within the cache service a copy of at least a portion of the object that the result link of the each search result points to.

In some implementations, the method further comprises: receiving, from the cache service, a notification of the result of the caching operation.

In some implementations, the instructing further comprises: determining if at least one performance measurement of the cache service is better than that of the content source corresponding to the result link; and if so, instructing the cache service to initiate the caching operation to cache the copy of at least the portion of the object.

In some implementations, the method further comprises: instructing the cache service to replace a cached copy of at least a portion of an object with an updated copy of at least the portion of the same object, based on one or more first criteria; or instructing the cache service to remove the cached copy of at least the portion of the object, based on one or more second criteria.

In some implementations, at least the portion of the object includes static content of the object, and wherein the object includes a Web page.

In some implementations, the auxiliary information includes an additional link associated with the at least one search result, the additional link pointing to the cached copy of at least the portion of the object.

In some implementations, an apparatus is provided. The apparatus comprises: a search results generating module to generate, in response to a search query, a plurality of search results, wherein each of the plurality of search results includes a result link pointing to an object stored on a content source; a search results sending module to send the plurality of search results; an auxiliary information generating module to generate auxiliary information indicating that, for at least one of the plurality of search results, a copy of at least a portion of the object that the result link of the at least one search result points to is cached within a cache service; and an auxiliary information sending module to send the auxiliary information.

In some implementations, a computing device is provided. The computing device comprises: one or more processing units; and a memory storing instructions that, when executed, cause the one or more processing units to perform any method described herein.

In some implementations, a non-transitory tangible computer-readable storage medium is provided. The storage medium has instructions stored thereon, the instructions, when executed on at least one processing unit, causing the at least one processing unit to perform operations of any method described herein.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
   receiving, from a search service, a plurality of search results in response to a search query, wherein each of the plurality of search results includes a result link pointing to an object stored on a content source;
   receiving, from the search service, auxiliary information indicating that, for at least one of the plurality of search results, a copy of at least a portion of the object that the result link of the at least one search result points to is cached within a cache service associated with the search service;
   retrieving, from the cache service, the cached copy of at least the portion of the object in response to a selection of the result link of the at least one search result;
   presenting, in a front view of a user interface, the cached copy of at least the portion of the object, the front being viewable by a user;
   presenting the object in a back view of the user interface while the object is being retrieved from the content source, where the back view is not viewable by the user; and
   switching the presenting of the object to the front view of the user interface once the object is retrieved from the content source.

2. The method of claim 1, wherein at least the portion of the object includes static content of the object.

3. The method of claim 1, wherein the object includes a Web page.

4. The method of claim 1, wherein the auxiliary information includes an additional link associated with the at least one search result, the additional link pointing to the cached copy of at least the portion of the object.

5. The method of claim 4, wherein the retrieving further comprises:
   retrieving, from the cache service, the cached copy of at least the portion of the object via the additional link.

6. A computing device, comprising:
   one or more processors; and
   a memory storing instructions that, when executed, cause the one or more processors to perform operations comprising:
   receiving, from a search service, a plurality of search results in response to a search query, wherein each of the plurality of search results includes a result link pointing to an object stored on a content source;
   receiving, from the search service, auxiliary information indicating that, for at least one of the plurality of search results, a copy of at least a portion of the object that the result link of the at least one search result points to is cached within a cache service associated with the search service;
   retrieving, from the cache service, the cached copy of at least the portion of the object in response to a selection of the result link of the at least one search result;
   presenting, in a front view of a user interface, the cached copy of at least the portion of the object, the front being viewable by a user;
   presenting the object in a back view of the user interface while the object is being retrieved from the content source, where the back view is not viewable by the user; and switching the presenting of the object to the front view of the user interface once the object is retrieved from the content source.

7. A non-transitory tangible computer-readable storage medium having instructions stored thereon, the instructions, when executed on at least one processing unit, causing the at least one processing unit to perform operations comprising:
   receiving, from a search service, a plurality of search results in response to a search query, wherein each of the plurality of search results includes a result link pointing to an object stored on a content source;
   receiving, from the search service, auxiliary information indicating that, for at least one of the plurality of search results, a copy of at least a portion of the object that the result link of the at least one search result points to is cached within a cache service associated with the search service;

retrieving, from the cache service, the cached copy of at least the portion of the object in response to a selection of the result link of the at least one search result;

presenting, in a front view of a user interface, the cached copy of at least the portion of the object, the front being viewable by a user;

presenting the object in a back view of the user interface while the object is being retrieved from the content source, where the back view is not viewable by the user; and switching the presenting of the object to the front view of the user interface once the object is retrieved from the content source.

\* \* \* \* \*